(12) United States Patent
Gray

(10) Patent No.: US 12,189,520 B2
(45) Date of Patent: Jan. 7, 2025

(54) METHODS OF GENERATING MACHINE LEARNING OUTPUTS

(71) Applicant: KORTICAL LTD, London (GB)

(72) Inventor: Andrew Gray, London (GB)

(73) Assignee: KORTICAL LTD, London (GB)

(*) Notice: Subject to any disclaimer, the term of this patent is extended or adjusted under 35 U.S.C. 154(b) by 208 days.

(21) Appl. No.: 17/596,297

(22) PCT Filed: May 27, 2020

(86) PCT No.: PCT/GB2020/051282
§ 371 (c)(1),
(2) Date: Dec. 7, 2021

(87) PCT Pub. No.: WO2020/249926
PCT Pub. Date: Dec. 17, 2020

(65) Prior Publication Data
US 2022/0308992 A1    Sep. 29, 2022

(30) Foreign Application Priority Data
Jun. 10, 2019   (GB) .................................. 1908282

(51) Int. Cl.
G06F 16/242    (2019.01)
G06F 11/36    (2006.01)
G06N 20/20    (2019.01)

(52) U.S. Cl.
CPC ...... *G06F 11/3696* (2013.01); *G06F 11/3664* (2013.01); *G06F 16/2425* (2019.01); *G06N 20/20* (2019.01)

(58) Field of Classification Search
None
See application file for complete search history.

(56) References Cited

U.S. PATENT DOCUMENTS

| | | | |
|---|---|---|---|
| 2018/0275989 A1* | 9/2018 | Kakkad | G06F 11/3409 |
| 2018/0276103 A1* | 9/2018 | Woulfe | G06F 11/36 |
| 2019/0108001 A1* | 4/2019 | Hauser | G06F 11/3668 |
| 2019/0121621 A1* | 4/2019 | Aggarwal | G06N 20/00 |

OTHER PUBLICATIONS

International Search Report and Written Opinion for PCT/GB2020/051282 date mailed Sep. 9, 2020.

* cited by examiner

*Primary Examiner* — Dawaune A Conyers
(74) *Attorney, Agent, or Firm* — Merchant & Gould P.C.

(57) ABSTRACT

A computer-implemented method for generating one or more outputs is disclosed. The method comprises providing code in a high-level language, the code comprising one or more statements defining one or more properties of a desired output; determining that one or more properties of the desired output are undefined in the code; defining at least one of the one or more undefined properties using a machine learning algorithm; generating an output based on the one or more properties defined in the code and the at least one property defined using the machine learning algorithm; and redefining at least one property of the output defined using the machine learning algorithm to generate a redefined output. At least one property defined using the machine learning algorithm is redefined automatically, and at least one property defined using the machine learning algorithm is redefined automatically based on an associated level of performance of one or more previous outputs.

12 Claims, 4 Drawing Sheets

METHODS OF GENERATING MACHINE LEARNING OUTPUTS

PRIORITY CLAIM

The present application is a National Phase entry of PCT Application No. PCT/GB2020/051282, filed May 27, 2020, which claims priority from Great Britain Application No. 1908282.5, filed Jun. 10, 2019, each of which is hereby fully incorporated herein by reference.

TECHNICAL FIELD

The present disclosure relates to methods of generating machine learning outputs.

BACKGROUND

Advances in computational capabilities have in recent years led to a rapid increase in the use and applicability of artificial intelligence and machine learning in a wide array of technical fields. Machine learning approaches are generally used where there is a sufficiently large search space for possible outputs or solutions and non machine learning approaches would be too slow or intractable to be of use.

As a result, machine learning solutions for generating a variety of outputs have been developed. The types of outputs which machine learning can help to develop are varied and numerous. Machine learning can help to generate outputs relating to predicting the likelihood of particular events, for example. Machine learning can also be used to generate more tangible outputs such as images or websites.

A problem faced by the industry arises from the fact that, once a given machine learning solution or model is built, that solution or model is then fixed and cannot be easily altered or manipulated. This makes it challenging to modify the machine learning solution or model in real time to react to new insights. Collaboration is also made difficult because findings and insights discovered by different parties using different solutions cannot be easily shared and combined.

A further problem faced by the industry relates to the fact that significant challenges exist in trying to optimise an initially produced output within a reasonable timeframe.

As can be seen, existing methods of generating machine learning outputs suffer from significant drawbacks. It would be advantageous to provide systems and methods which address one or more of these problems, in isolation or in combination.

Overview

This overview introduces concepts that are described in more detail in the detailed description. It should not be used to identify essential features of the claimed subject matter, nor to limit the scope of the claimed subject matter.

According to one aspect of the present disclosure, there is provided a computer-implemented method for generating one or more outputs, comprising providing code in a high-level language, the code comprising one or more statements defining one or more properties of a desired output. The code may be suitable for generating the desired output.

An output can be considered as the resulting deliverable of a machine learning process. An output can also be considered as the product, article, result, outcome or other output produced by a computer or computer system performing one or more methods of the present disclosure. Example outputs include outputs such as images or machine learning solutions/machine learning models.

A high-level language can be considered as a language that can be interpreted by a human user and is contrasted with low-level or executable code that can be interpreted and/or executed by a computer processor. In a high level language there may be a strong abstraction from low level code allowing code and statements to be written in human readable form. Providing the code in a high-level language may enable a user to understand, interpret and optionally edit the code. The code may be text-based. The code may be numeric. The code may be configurable by a user. The statements may be user-definable. By providing code that comprises user-definable statements, the code may be easily edited by a user. If it has been determined that a particular set of defined statements in the code has led to effective results, in particular the generation of successful outputs, then these statements can easily be extracted from one set of code and inserted into another set of code. This greatly improves the ability of users to share and collaborate with one another, for example by combining sections of high-level code that have been determined to work effectively.

The method may comprise determining that one or more properties of the desired output are undefined in the code, and defining at least one of the one or more undefined properties using a machine learning algorithm. The method may comprise generating an output based on the one or more properties defined in the code and the at least one property defined using the machine learning algorithm.

By providing a method where properties of the output that are not initially defined in the code may be defined using a machine learning algorithm, the initial code provided does not need to be fully specified. In other words, the code does not need to initially specify or define all properties of the output. This is in contrast to existing methods where all properties of an output typically need to be defined at the outset by the user. Enabling the user to leave some properties of the output undefined can enable the user to define those properties which are of a high priority, or which they are confident about (for example based on previous experience). The remaining properties, which the user may be less confident about or which may be of a lower priority, may then be defined by the machine learning algorithm. Human experience can therefore be combined with machine learning to generate a more optimal output. This is advantageous, because in many cases a combination of human experience and machine learning produces better results than human experience alone or machine learning alone.

The method may further comprise redefining at least one property of the output defined using the machine learning algorithm to generate a redefined output, wherein at least one property defined using the machine learning algorithm is redefined automatically, for example by the same machine learning algorithm which initially defined the at least one property. The at least one property may be automatically redefined based on an associated level of performance of one or more previous outputs. The level of performance of the one or more previous outputs may be compared to a performance of the initially generated output, and the redefining of the output can be based on this comparison. Comparisons between outputs may be facilitated by scoring outputs based on one or more evaluation metrics.

The redefining of the at least one property of the output can comprise attempting to increase the associated level of performance of the output. By determining an associated level of performance of an output, redefining at least one property of the output and determining an associated level of performance of the redefined output, it can be determined whether the redefinition achieved an intended goal. In an example, the intended goal may be to improve the associated level of performance of the output. Thus, a feedback loop may be provided. The feedback loop can occur multiple times with the aim of producing an output with a higher associated level of performance with each iteration, such that the output is iteratively improved. Ultimately, this process can thereby lead to a more optimal output. Optimisation of the output through redefinition can result in outputs being optimised and suitable for use or release to market in a smaller timeframe. As will be described in more detail below, the feedback loop, in other words the redefinition of one or more properties of the output, can comprise receiving input from a user as well as automatic redefinition.

As mentioned above, the method may comprise determining that one or more properties of the desired output are undefined in the code, and defining at least one of the one or more undefined properties using a machine learning algorithm. The at least one property defined using the machine learning algorithm in this manner may be incorporated into the code in at least one statement to provide a first modified version of the code. The output may then be generated based at least partly on the first modified version of the code. In other words, the machine learning algorithm can operate at the level of the code, by effectively filling in all or some "gaps" in the code. The output can then be generated based on the more fully defined code (in other words the code with the gaps filled by the machine learning algorithm).

Alternatively or additionally, the at least one property of the output defined using the machine learning algorithm can be defined at another stage of the process. For example, the output can be generated based on the code initially provided, in other words the incomplete code with one or more properties of the output undefined, and the machine learning algorithm can populate the missing (undefined) properties of the output directly or at some level of abstraction in between the code and the final output. In other words, defining the undefined properties of the output need not occur at the high-level language level. Regardless of which process is used, the method can generate an output with more properties defined than were defined initially. Thus, where a user provides the initial code, the user may leave one or more properties of the output undefined and rely on the machine learning algorithm to define these undefined properties. As already mentioned, this enables human experience and machine learning to be combined to produce a more optimal output in an efficient manner.

As mentioned above, the method may comprise redefining at least one property of the output defined using the machine learning algorithm to generate a redefined output. In the same way as properties of the output initially defined by the machine learning algorithm can be incorporated at the high-level language level, redefinition of properties can also occur at the high-level language level. In other words, redefining at least one property of the output may comprise amending or adding at least one respective corresponding statement in the code to provide a second modified version of the code. The addition and/or redefining of statements in the code may be performed automatically using the machine learning algorithm. The redefined output may then be generated based at least partly on the second modified version of the code.

Alternatively or additionally, redefining at least one property of the output can occur at a level other than the high-language level, in the same way as the initial definition of the properties of the output can also occur at a level other than the high-language level.

At least one property defined using the machine learning algorithm may be redefined via user input. In other words, the method may comprise receiving user input and, based on the user input, redefining at least one property of the output defined using the machine learning algorithm. Redefining a property of the output via user input may comprise receiving an amendment from a user to a corresponding statement previously provided in the code. Redefining a property of the output via user input may alternatively or additionally comprise receiving an addition, from a user, of a new statement in the code corresponding to a property of the output that was not previously defined in the code. In other words, as previously mentioned, redefining at least one property of the output may comprise amending or adding at least one respective corresponding statement in the code to provide a second modified version of the code. The addition and/or amendment of statements in the code may be performed via user input. Manual redefinition of properties of the output can be performed in combination with automatic redefinition of properties of the output by the machine learning algorithm. As a result, the second modified version of the code mentioned above, which can be used to generate the redefined output, may comprise amendments and/or additions made automatically and amendments and/or additions made via user input. The redefined output may then be generated based at least partly on the second modified version of the code comprising the amendments and/or additions made automatically and via user input. As a result, the ability of a user and a machine learning algorithm to collaborate may be further increased, enabling a more optimum output to be generated based on a combination of human experience and machine learning.

The machine learning algorithm may be a solution space search algorithm. The solution space search algorithm can comprise one of: a Bayesian algorithm; an evolutionary algorithm, for example a genetic programming algorithm; a quantum annealing algorithm; a reinforcement learning algorithm; hyperbanding; a gradient-based algorithm; a population-based training algorithm; a supervised machine learning algorithm; or an unsupervised machine learning algorithm. Other machine learning algorithms can be used and will be apparent to a person skilled in the art.

The initial code on which the output is at least partly based can be initially provided by user input or can be initially provided automatically. Where the code is initially provided automatically, the method may further comprise, prior to providing the code in a high-level language, providing a set of data to the machine learning algorithm and generating, using the machine learning algorithm, the code in the high-level language based on the set of data. In particular, the machine learning algorithm may use the set of data to determine the relevant properties that should be defined in the code to produce a relevant output.

There may be a plurality of undefined properties of the desired output in the code. The plurality of undefined properties of the desired output may comprise a first undefined subset of properties of a first type, wherein the first type of property may be specified in the high-level language of the code. The plurality of undefined properties of the desired output may comprise a second undefined subset of properties of a second type, wherein the second type of property may not be specified in the high-level language of the code. A first machine learning algorithm and a first score-based feedback mechanism may be used to define the first undefined subset of properties. A second machine learning algorithm and a second score-based feedback mechanism may be used to define the second undefined subset of properties. The first feedback mechanism may be the same as the second feedback mechanism, or may be different.

The first machine learning algorithm may be a particular type of machine learning algorithm which is particularly well suited to defining properties of the first type. Similarly, the second machine learning algorithm may be a particular type of machine learning algorithm which is particularly well suited to defining properties of the second type. Using a first and second machine learning algorithm to define different types of properties in this manner may be more efficient and/or lead to better outputs than if the same machine learning algorithm were used to define all types of property of the output.

The first machine learning algorithm may be used to define one or more undefined properties of the output at the level of the high level language. In other words, the at least one property defined using the first machine learning algorithm may be incorporated into the code in at least one statement to provide a first modified version of the code, in the manner described above. The output may then be generated based at least partly on the first modified version of the code, as also described above. The second machine learning algorithm may define at least one property of the output at a level other than in the high-level language code. This may be advantageous where, for example, the at least one property defined by the second machine learning algorithm is too complex to be described easily in the high level language, or where a property is less significant to the performance of the output or where the user is unlikely to want to specify that property in code in future. The first or second machine learning algorithms may comprise a mixture of algorithms that perform better on different parts of the problem or as a whole.

While use of two machine learning algorithms and two types of property has been described, this is merely an example and it will be apparent that the output may comprise any number of types of property and any number of algorithms and/or machine learning algorithms may be used to define the various types of property.

The one or more outputs may be machine learning models. A machine learning model (or machine learning solution) can learn to approximate the relationship between a set of input observations and their observed outcomes. The machine learning model (or machine learning solution) can be used to make predictions of the outcome of new input observations, the actual outcomes of which may be, and typically are, unknown. Typically, a machine learning model (or machine learning solution) comprises a series of algorithms and transformations which can learn to approximate the relationship between a set of input observations and their observed outcomes.

When the one or more outputs are machine learning models, the method may further comprise providing training data to the machine learning algorithm for training the machine learning algorithm to define undefined properties of the machine learning models. If the machine learning models have an associated level of performance, the level of performance associated with each machine learning model may be based on test data.

The method may further comprise determining, based on the properties defined in the code used to define the desired output, an intended purpose of the desired output, wherein defining at least one of the undefined one or more properties using a machine learning algorithm is based at least in part on this determination. In other words, the machine learning algorithm may determine an intended purpose of the desired output based on the properties of the output that are defined.

For example, the machine learning algorithm may determine from the code that a particular type of output is intended to be generated, based on the output properties defined in the code. The machine learning algorithm may take this determination into account when defining any undefined properties of the output. For example, the machine learning algorithm may preferentially define certain properties in a particular way depending on the type of output that is intended, in other words on the determined intended purpose of the desired output.

According to another aspect of the present disclosure, there is provided a computer program comprising computer-executable instructions which, when executed by one or more computers, cause the one or more computers to perform any of the methods described herein.

According to another aspect of the present disclosure, there is provided a computer system comprising one or more computers having a processor and memory, wherein the memory comprises computer-executable instructions which, when executed, cause the one or more computers to perform any of the methods described herein.

BRIEF DESCRIPTION OF THE FIGURES

Illustrative implementations of the present disclosure will now be described, by way of example only, with reference to the drawings. In the drawings.

Throughout the description and the drawings, like reference numerals refer to like features.

DETAILED DESCRIPTION

Figure 1:
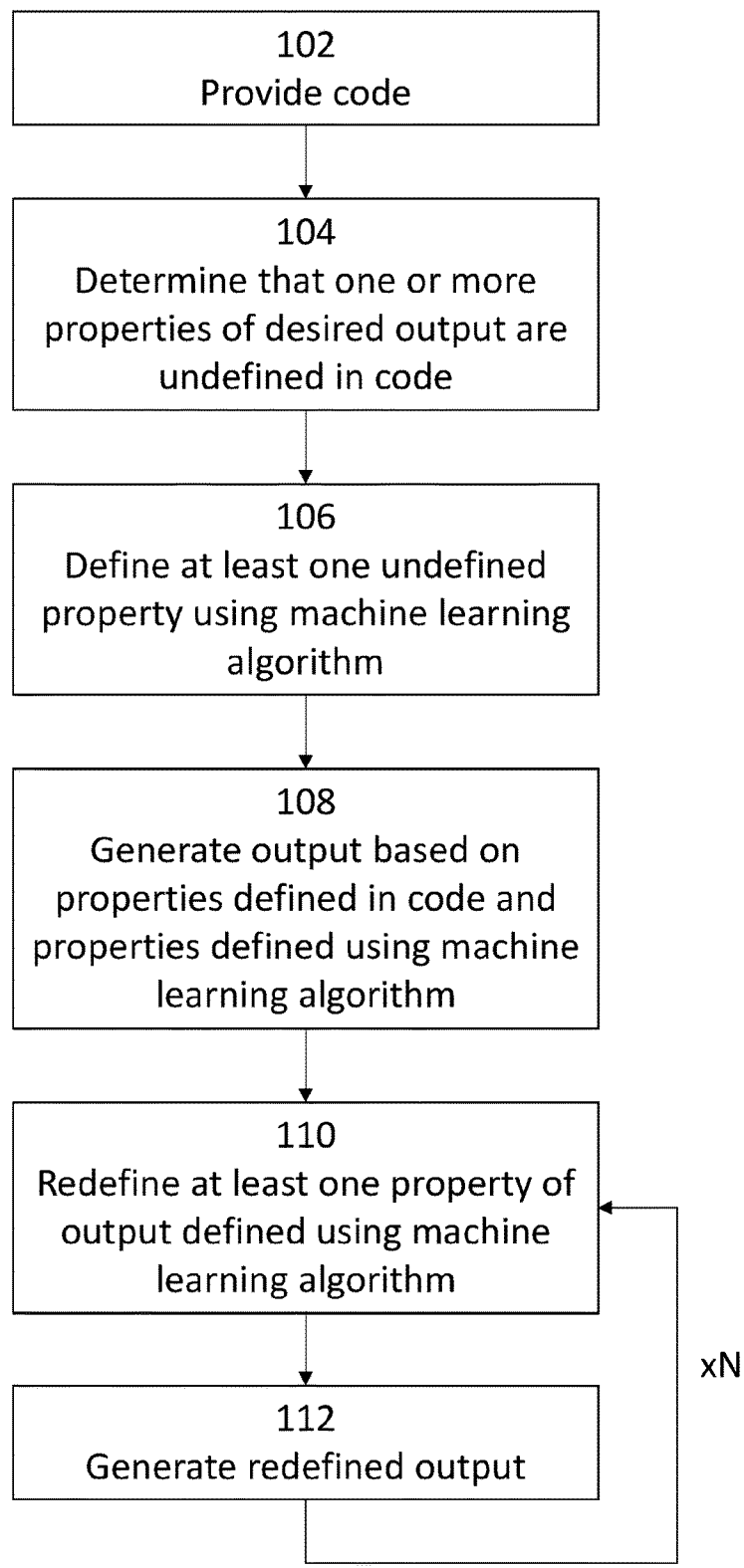
FIG. 1 shows a method of generating one or more outputs according to methods of the present disclosure.
Figure 2:
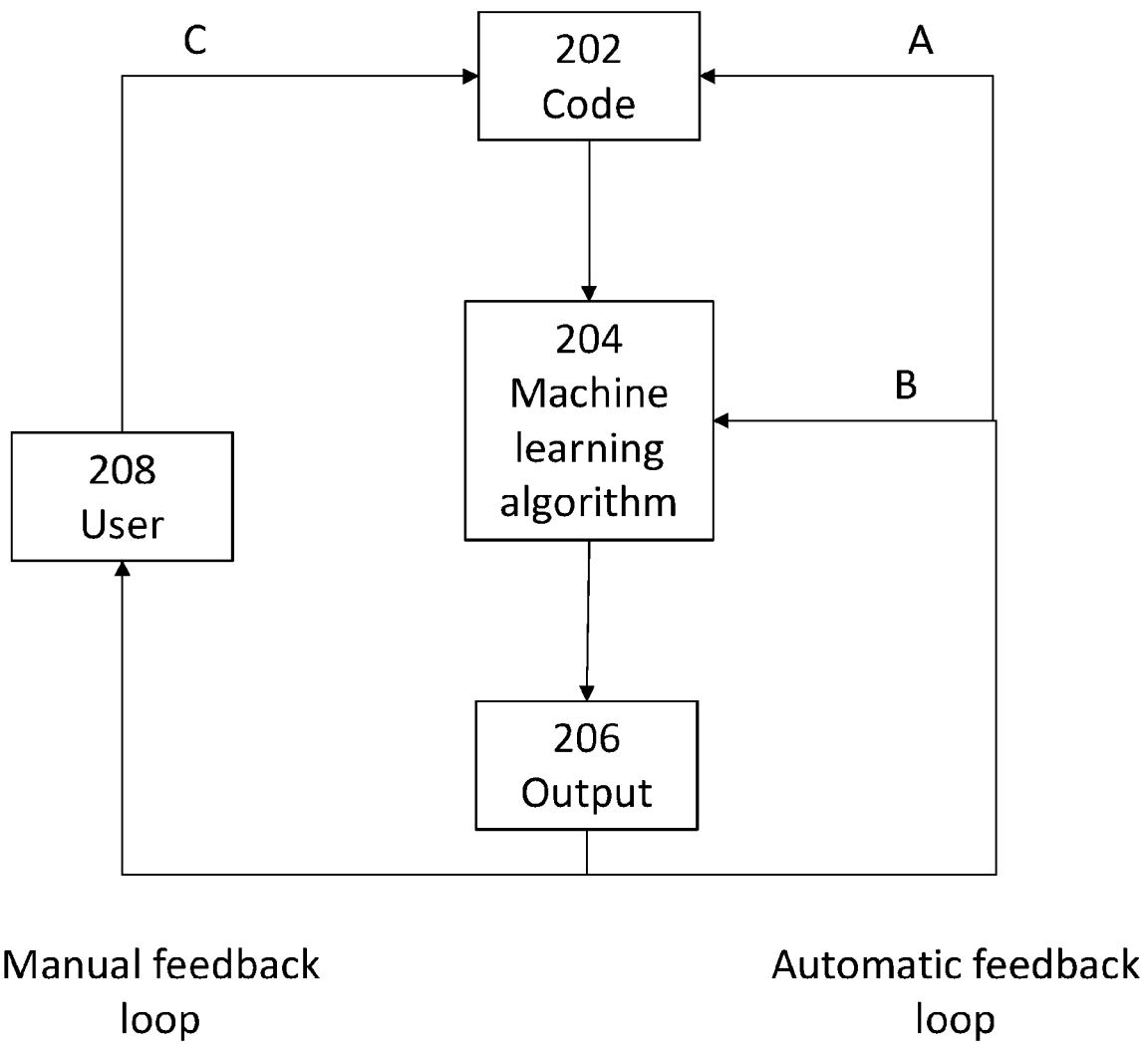
FIG. 2 shows a schematic feedback loop mechanism for redefining outputs automatically and via user input according to methods of the present disclosure.

This detailed description describes, with reference to FIG. 1, a method of generating one or more outputs according to methods of the present disclosure. A feedback loop mechanism which allows for manual and automatic redefinition of properties of outputs is described with reference to FIG. 2. Two example implementations of the disclosed methods which make use of the functionality described in reference to FIGS. 1 and 2 are then described to aid understanding. Various additional functionality that can be combined with the methods of FIGS. 1 and 2 and the example implementations is then described, with reference in particular to FIGS. 3 and 4. Finally, an example computer system for performing the disclosed methods is described with reference to FIG. 5.

The methods disclosed herein relate generally to methods for generating outputs using machine learning algorithms. An output can be considered as the resulting deliverable of a machine learning process or the product, article, result, outcome or other output produced by a computer or computer system performing one or more methods of the present disclosure. An output can be anything that can be generated by providing code to a machine learning system or process. Example outputs include web pages, images and machine learning models.

A method for generating one or more outputs in accordance with the methods of the present disclosure is shown in FIG. 1. This method will be initially described at a high level, however two specific example implementations will then be described to aid understanding.

Turning to FIG. 1, at block 102, code is provided to a computer system (the terms "computer system" and "system" will be used interchangeable herein). In this example implementation, the code is provided in a high-level language that can be interpreted and written in by a user.

The particular high-level language used will vary based on the implementation, as will be appreciated by a person skilled in the art. The code comprises a number of statements in said language, which each defines a property of an output to be generated by the code. The code is provided in a domain-specific language, wherein the domain is that of the output that is desired to be generated. As will be appreciated by a person skilled in the art, a "domain" in this context is a term of art relating to everything inside the boundary of a particular or specific problem space. The problem space can be considered as referring to the entirety of elements that are involved in solving a particular problem. In other words, the problem space can be considered to define the borders that frame the problem. The problem space will contain the problem definition including any required data, the identification and testing of solutions and the choice/implementation of a solution.

In an example, the output that is desired to be generated is an image. In this case, the code will contain statements defining various properties of the image. For example, statements in the code may define shapes, colours and features of the image.

Typically, in existing methods a set number of properties of the desired output would need to be defined in the code for the output to be generated from the code. For example, in existing methods if an image of a car is desired to be output, the user would need to define all relevant properties of the car. The methods disclosed herein enable this restriction to be overcome, by using machine learning to define some or all of the properties of the output that are not defined by the user. This process will now be described.

At block 104, a machine learning algorithm (or another element of the system) determines that one or more properties of the desired output are not defined in the high-level code provided at block 102. In existing systems this would typically result in an error, because existing systems require all properties of an output to be specified before the output can be generated. In contrast, the disclosed methods enable the output to be generated despite the fact that some properties of the output are not defined in the high-level code, as will now be described.

At block 106, at least one property of the output that is undefined in the code is defined using a machine learning algorithm. In this example the machine learning algorithm is being run by the computer system to which the code is provided at block 102. In the present example all undefined properties of the output are defined using the machine learning algorithm at this stage, although in some variations only a subset of the properties is defined. In some implementations defining the at least one undefined property may be based on training data that has been provided to train the machine learning algorithm.

The machine learning algorithm used to define the undefined properties is in this example implementation a solution space search algorithm. The solution space search algorithm may comprise a Bayesian algorithm; an evolutionary algorithm, for example a genetic programming algorithm; a quantum annealing algorithm; a reinforcement learning algorithm; hyperbanding; a gradient-based algorithm; a population-based training algorithm; a supervised machine learning algorithm; or an unsupervised machine learning algorithm. Other machine learning algorithms can be used and will be apparent to a person skilled in the art.

At block 108, the desired output is generated based on the one or more properties of the output defined initially in the high-level code and the at least one property of the output defined using the machine learning algorithm. In some implementations the generated output may have precisely the properties specified in the high-level code and the properties defined using the machine learning algorithm, in other words the properties specified in the code and defined by the algorithm have a one-to-one relationship with the properties of the generated output. In alternative implementations the generated output may have one of a set of properties specified in the high-level code. In other words, the properties specified in the code may have a many-to-one relationship with the properties of the generated output. For example, the code may specify a number of potential options for a particular property, and these potential options may shape the so-called "search space", which is the range of parameters which the machine learning algorithm considers when determining how to define a particular property. For example, a number of potential options for a particular property of the output may be specified in the high-level code, and the machine learning algorithm may then select one of these options. The various options provided for a given property in the code may be mutually exclusive.

In this example implementation, the at least one property of the output defined by the machine learning algorithm at block 106 is incorporated into the output at the high-level language level. In other words, in this example implementation the at least one property defined using the machine learning algorithm is incorporated into the code in at least one corresponding statement, to provide a modified version of the code. The output is then generated at block 108 based at least partly on this modified version of the code. In other implementations, however, the at least one property of the output defined by the machine learning algorithm can be incorporated into the output at a level other than the high-level language level. In either case, the end result is an output comprising properties that were not defined in the high-level code that was initially provided at block 102 for generating the output. As previously mentioned, this marks a significant departure from existing methods where all of the properties of the output need to be defined in the code at the outset.

Because the undefined properties of the output are defined by a machine learning algorithm, it is beneficial to provide some form of feedback mechanism whereby the performance of the machine learning algorithm can be iteratively improved and the quality or performance of a given output, measured according to some evaluation metric, can be iteratively increased and optimised.

Accordingly, at block 110 at least one property of the output defined using the machine learning algorithm at block 106 is redefined. This redefining can be automatic or can be via user input, as will be described in more detail in relation to FIG. 2 below. In this example implementation the redefinition performed at block 110 is performed by the same machine learning algorithm which defined the original properties at block 106. The redefining in this example is based on an associated level of performance of the generated output when compared to the associated level of performance of one or more existing previously generated outputs. This process will also be described in further detail in relation to FIG. 2 below.

Once the one or more properties of the output have been redefined at block 110, a new redefined output is generated at block 112. The redefined output has the same properties as the original output generated at block 108, except for those properties that were redefined at block 110.

This process of redefining properties of the output to generate a redefined output happens multiple (i.e. N) times in this example. N in this example is a fixed pre-determined number, however the generation of redefined outputs can alternatively occur until a threshold level of performance for the output is reached, or until a command is received to end the process, for example from a user. Each redefined output has an associated level of performance in this example, where the associated level of performance is based on some evaluation metric. The evaluation metric will typically be specific to the type of output being generated and the type of machine learning algorithm being used to generate the outputs.

The system is configured such that redefinitions of properties which result in outputs with higher associated levels of performance are favoured, in other words subsequent outputs are biased to include these successful redefinitions. Through this process, the quality of outputs produced can be optimised iteratively, and the machine learning algorithm can become iteratively better at generating outputs. Each new output, or a representation thereof, is in this example stored in a database or digital library along with its associated level of performance. As a result, each new output increases the data set of outputs and associated performance levels available to the machine learning algorithm for comparison. Thus, the feedback loop is self-reinforcing: further iterations increase the size of the data set which can be referenced for comparison, and a larger data set in turn improves the ability of the machine learning algorithm to compare outputs and determine the most optimum way of defining and redefining properties of outputs in different circumstances.

Insights into which properties or combinations of properties generally lead to well performing outputs for a particular domain can be gained by users through the iterative feedback mechanism. These insights can be shared to aid collaboration. In particular, when the redefinitions of the properties of the output occur at the level of the high-level language, these redefinitions can be easily interpreted and shared. Indeed, because the properties of the output are defined in high-level code, portions of the code can be exported and shared. For example, it may become apparent that a given set of properties is often associated with outputs with high levels of associated performance for a particular domain. As a result, the portion of the code defining those properties can be extracted, shared and incorporated into other respective code belonging to other respective users with ease. This overcomes a problem with existing methods where it is difficult to combine insights and portions of solutions.

The redefinition process introduced in reference to Blocks 110 and 112 of FIG. 1 will now be described in further detail with reference to FIG. 2, which shows a system comprising both a manual feedback loop and an automatic feedback loop. The combination of these two mechanisms provides a symbiotic mechanism through which user input and machine learning can interact and complement one another to efficiently optimise outputs. Outputs can thereby by optimised in a reduced timeframe compared to existing methods.

The process flow of FIG. 2 begins with code 202, which is the high-level code provided at block 102 of the method of FIG. 1. As described in reference to FIG. 1, the code 202 comprises one or more statements defining one or more properties of a desired output. The code 202 is provided to a machine learning algorithm 204, and it is determined that one or more properties of the desired output are not defined in the code 202. This process is indicated schematically in FIG. 2 by the arrow going from the code 202 to the machine learning algorithm 204.

The machine learning algorithm 204 then defines at least one missing (i.e. undefined) property of the output and an output 206 is generated based on the property or properties defined in the code 202 and the property or properties defined by the machine learning algorithm 204. The process of the machine learning algorithm 204 defining the undefined property or properties of the output is represented by the arrow linking the machine learning algorithm 204 and the output 206 in FIG. 2.

Once the output 206 has been generated, one or more of the properties of the output can be redefined to generate a redefined or revised output, as described in reference to Blocks 110 and 112 of FIG. 1. In this example implementation the properties that can be redefined are those properties which were defined by the machine learning algorithm 204. However, in other implementations the properties originally defined in the original code 202 may also be redefined.

In this example the redefining process is performed multiple times and is directed towards iteratively optimising the generated output 206. In other words, a feedback loop is provided. More specifically, an automatic feedback loop is provided whereby the machine learning algorithm 204 redefines properties of the output 206. A manual feedback loop is also provided in this example, to enable properties of the output 206 to be redefined through user input. Both the automatic and manual feedback loops are shown schematically in FIG. 2 and will now be described in more detail.

Once an initial output 206 has been generated, an automatic feedback loop may begin. In the present example, the first step in this feedback loop is that the generated output 206 is scored, based on an evaluation metric. It will be appreciated that the evaluation metric used will vary based on the specific implementation. More than one evaluation metric (or evaluation process) may be used to generate a score for the output. Ultimately, the score is indicative of the performance of the output 206 relative to the evaluation metric being used.

As one non-limiting example, provided merely to aid understanding, the output 206 may be a machine learning model configured to generate predictions. Once the model is generated, the model can be tested on unseen training data that was not used during generation of the model. This unseen data is known as a test set. It can then be determined how proficient the generated model is at generating the correct predictions against the test set. In this particular example, there are many available evaluation metrics and several may be used simultaneously to generate a single performance score. For example, if the model produced accurate predictions in 50% of cases, it may be assigned a performance score of 0.5. For this evaluation metric the scores would range between 0 and 1. It will be appreciated that the way in which outputs are scored will depend on the circumstances of each specific implementation, in particular what feature(s) of the output are being optimised, the type of output and user preferences.

Once an output has been scored, this score is compared to the performance levels (i.e. scores) associated with other existing outputs. The existing outputs are in this example provided in a database or digital library of outputs. The library or database is in this example globally accessible to all systems and machine learning algorithms performing the disclosed methods. In this example each new output produced using the disclosed methods is scored and added to the database or library, such that a comprehensive database of outputs with associated levels of performance is continuously built up. The library or database in this example also indicates whether particular redefinitions of properties of outputs led to improved or reduced associated levels of performance, in other words led to higher or lower scores for the outputs.

Based on this information, the initially generated output 206 is compared to the existing outputs in the database or library and any other relevant information. Based on the comparison, the machine learning algorithm 204 redefines one or more properties of the output 206, with the aim of increasing the associated level of performance of the output 206.

The precise manner in which the output 206 is compared to existing outputs will depend on the specific context in which the method is being carried out, as well as the type of machine algorithm 204 being used. Similarly, the precise manner in which the machine learning algorithm 204 determines which properties to redefine and how to redefine them will also depend on the specific context in which the method is being carried out, as well as the type of machine algorithm 204 being used. In some examples, all known existing outputs are ranked based on their associated scores. Some metrics will be ascending, others descending. In some cases, the evaluation metric to be used is defined in the high-level code provided for generating the output 206.

Typically, the machine learning algorithm will use the database or library to find relevant or related outputs with high associated performance levels. The machine learning algorithm will also typically determine which properties and/or combinations of properties are included in these high-performing outputs. Based on this, the machine learning algorithm will redefine one or more properties of the generated output 206, with the aim of improving the associated level of performance of the output 206. For example, the machine learning algorithm 204 may select or positively weight properties that have historically resulted in outputs with high levels of associated performance and incorporate these properties into output 206.

As mentioned previously, in this example implementation the machine learning algorithm 204 redefines properties of the output 206 at the level of the high-level code, by modifying one or more corresponding statements in the code and generating a redefined output based on the modified code. This language-level redefinition of the output is represented in FIG. 2 by the arrow labelled with the letter "A", which loops from the output 206 to the machine learning algorithm 204 via the code 202 to represent the fact that the code 202 is being modified by the machine learning algorithm 204 in this example, and that the redefined output is being generated based on the modified code.

As mentioned previously, in other implementations the machine learning algorithm 204 may alternatively or additionally redefine properties of the output 206 at a level other than the level of the high-level code. For example, the machine learning algorithm can redefine properties of the output directly or at some level of abstraction in between the code and the output. This alternative method of redefining the output is represented in FIG. 2 by the arrow labelled with the letter "B", which does not go via the code 202 to represent the fact that the code 202 is not being modified by the machine learning algorithm 204 in this example and that the redefined output in this example need not necessarily be generated based on modified code (i.e. the output can be redefined directly or at another level of abstraction).

Regardless of the precise method used, by redefining properties of the output 206 a redefined output is generated. The redefined output can be considered as a distinct output in its own right, or can be considered as simply a modified version of the same original output 206.

The associated level of performance of the redefined output is in this example scored based on the same evaluation metric as the original output 206. It is determined whether the associated level of performance of the redefined output is higher or lower than the associated level of performance of the original output 206. If the associated level of performance has increased, then this is indicative that the redefinition of the one or more properties of the output 206 was successful. If the associated level of performance has decreased, then this is indicative that the redefinition of the one or more properties of the output 206 was unsuccessful. The redefined output and its associated level of performance are recorded to the database or library.

An indication of whether the redefinition or set of redefinitions was successful or unsuccessful is provided to the machine learning algorithm 204. The machine learning algorithm 204 is configured to preferentially bias successful redefinitions in future iterations of the output. In other words, when the redefined output is redefined once again, the machine learning algorithm 204 will typically retain and positively bias the previous redefinitions if they were successful (led to an improved associated performance level), or will negatively bias or even discard them if they were unsuccessful (led to a worse associated performance level). Through this process, the machine learning algorithm 204 can iteratively produce outputs with ever increasing associated levels of performance, for example until an acceptable threshold level of performance has been reached.

Information indicative of whether particular redefinitions were successful or not are also be recorded to the database or library in this example. The database or library is accessible by other systems utilising the disclosed methods, such that the machine learning algorithms of those other systems may draw on this information to aid them in determining the likelihood that a particular redefinition of a property or set of properties will increase or decrease the associated level of performance of a particular output which they are in the process of redefining.

In the example implementation of FIG. 2, a manual feedback loop is provided alongside the automatic feedback loop just described. This manual feedback loop enables a user 208 to take part in the iterative optimisation of the output 206, improving the efficiency with which the output 206 can be optimised.

After generation of the initial output 206, the user 208 may elect to redefine one or more properties of the output 206 manually. Accordingly, the user may modify one or more corresponding statements defining properties of the output 206 in the code 202. The user 208 has the option of modifying only those statements corresponding to properties previously defined by the machine learning algorithm 204, or also modifying statements that were initially provided in the original code 202. On modifying a statement, a user may specify one particular property for the redefined output. Alternatively, the user may specify a number of options for the property without actually specifying which of the options should be selected. This restricts the search space of the machine learning algorithm 204, such that the machine learning algorithm will select one of the options provided by the user 208. The user 208 may also add entirely new statements corresponding to properties of the output that were previously not specified in the code 202. By making modifications in this manner and redefining properties, the user 208 can specify particular properties and can guide the automatic feedback loop by restricting the search space of the machine learning algorithm 204.

This method of redefining properties of the output by the user 208 occurs at the high-level code level and is represented in FIG. 2 by the arrow labelled with the letter "C" which represents the fact that the user 208 is modifying the code 202 and the redefined output is then being generated based on the modified code. If the automatic feedback loop is also occurring at the code-level, then the automatic redefinitions of the properties of the output 206 will also be incorporated in the code 202. These automatic redefinitions can therefore be interpreted and evaluated by the user 208, and the user may opt to alter one or more of the automatic redefinitions made to the code.

By enabling a user 208 to take part in the iterative optimisation of the output 206 in this manner, the disclosed methods provide a highly versatile and powerful mechanism for generating and optimising outputs efficiently. In particular, the user 208 can provide input in relation to redefining as many or as few properties of the output 206 as they wish. A user 208 may have learnt from past experience that a given property or combination of properties results in an optimised output. Accordingly the user 208 may specify these properties manually. This may lead to those particular properties being optimised far more quickly and requiring fewer iterations than if the machine learning algorithm 204 were left to determine all of the properties by itself. On the other hand, there may be some properties for which the user 208 is unsure of the optimum choice. Alternatively, the user may simply not want to spend time defining one or more properties, for example if they are of low importance. In either case, these properties can be left to the machine learning algorithm 204 to define and optimise, in other words can be redefined and optimised through the automatic feedback loop of FIG. 2. If the user 208 changes their mind at some later point and wishes to take back control over one or more properties that have been automatically defined, the user 208 can easily do so by intervening during a redefinition cycle and amending the relevant part(s) of the code 202 manually.

Having described the underlying principles of the disclosed methods in relation to FIGS. 1 and 2, two example implementations of the disclosed methods will now be described to aid understanding. In the first implementation, a method of generating and optimising an output comprising an image of a vehicle will be described. In the second implementation, method of generating and optimising an output comprising a machine learning model for predicting how long a patient will wait for a kidney transplant will be described. Later, various potential additional functionalities which can be provided in combination with the functionality described above and in combination with the first and second example implementations will be described.

It will be appreciated that both implementations are merely presented as examples to aid understanding and are not intended to be limiting. The methods and mechanisms of the present disclosure will find application in many other fields, and the precise details of how the disclosed methods are implemented will depend on each individual situation. The features and functionality described in reference to each example implementation can be combined in any suitable combination.

Turning to the first example implementation, a user may desire to use the disclosed methods to assist in generating visual vehicle designs. In particular, the user may wish to generate outputs comprising images of vehicles having various properties. The user may wish to define some of these properties manually, while using machine learning insights to define other properties. For example, the user may want to ensure that one or more technical aspects of the vehicle design are optimised, such as to improve a characteristic of the vehicle such as aerodynamics. To do so, the user in this example implementation can make use of a computer system utilising the methods and mechanisms of the present disclosure, as will now be described.

As described in detail above in relation to FIGS. 1 and 2, the disclosed methods provide a user with great freedom in terms of which properties of an output they want to manually define and which they want to leave to be defined by a machine learning algorithm. In this example, the user is interested in generating images of vehicles that are red cars. Beyond these high level requirements, the user is in this example initially content to allow the machine learning algorithm to generate the remaining properties of the image. Indeed, in this example the user intends to allow the machine learning algorithm to ensure that the generated vehicle design is optimised in terms of aerodynamics.

Accordingly, in this example the user begins the process by providing code for generating the output, as was described in reference to block 102 of FIG. 1. In this example, the code is provided in a high-level language and comprises the following user-defined statements:

vehicle_type: car
colour: red
car_type: sedan

In this example, there are an almost limitless number of properties of the output (the image of the vehicle) which the user could specify manually in the initially provided code if they wanted to. For example, the user could specify the type of car, the size of car, the number of wheels, the number of doors, the size and shape of the wingmirrors and so forth. However, as described above, the disclosed methods and mechanisms enable the user to define as many or as few outputs as they wish. In this case, the user has decided to only define three properties of the output, namely the type of vehicle, the colour and the car type.

The code generated by the user is provided to a computer system configured to use a machine learning algorithm in accordance with the methods disclosed above. The system determines that various properties of the output (the image) are undefined, in the manner described with reference to blocks 104 and 106 of FIG. 1. In this particular example, the system is configured such that there are four high-level properties of outputs of a first type that need to be defined in the high-level code to enable generation of the output: vehicle type, colour, and where the vehicle is a car, car type and engine type. Because the property "engine type" has not been specified by the user, the machine learning algorithm defines this missing property in the high-level code. As a result, in this example implementation, the machine learning algorithm generates a modified version of the initial code provided by the user. The modified code comprises the following statements:

vehicle_type: car
colour: red
car_type: sedan
engine_type: electric

As can be seen, the machine learning algorithm has defined a property of the output which was left undefined by the user, namely the engine type, and has inserted this property as a statement into the code for generating the output. Other properties will then be defined by the machine learning algorithm directly, and will not be inserted at the code level. In other words, in this example implementation the machine learning algorithm uses both options indicated by labels "A" and "B" in FIG. 2. In some implementations none or all of the properties defined by the machine learning algorithm are inserted at the code level, in other words only the "A" method or only the "B" method may be used.

In this example the machine learning algorithm is configured to optimise aerodynamics, and so the determination of the engine type property was made by the machine learning algorithm based on historical data of which engine type was most commonly associated with cars having good aerodynamics. It will be appreciated however that the way in which the machine learning algorithm determines how to define properties of outputs will differ depending on the specific scenario, output type and type of machine learning algorithm used.

In this example the system then generates an output based on the modified code, as was described in reference to block 108 of FIG. 1. The generated output has the properties specified by the user in high-level code (vehicle type, colour, car type) and the property specified by the machine learning algorithm in high-level code (engine type). The output also has myriad other properties of a second type that were not specifically defined in the code but were defined directly by the machine learning algorithm when generating the output. These lower-level properties include features of the output such as the size of car, the number of wheels, the number of doors, type and size of wingmirror and so forth. The lower-level properties in this example are generated by the machine learning algorithm based on previous training data comprising images of aerodynamic cars which the machine learning algorithm has been trained on. As a result, an output comprising a realistic image of a red electric-type sedan car with aerodynamic features is generated. As will be apparent to a person skilled in the art, the lower-level properties may be generated by the machine learning algorithm based on other factors and/or training data.

At this point, the feedback loop part of the process described above in reference to FIG. 2 begins. In this example implementation the feedback process comprises an automatic and a manual feedback loop, however other example implementations may include only the automatic feedback loop or only the manual feedback loop. Through the automatic feedback loop process, the design of the car can be iteratively optimised, in other words made more aerodynamic in this example, by the machine learning algorithm. Through the manual feedback loop the user can also decide to manually modify the design. This will now be described in further detail.

In this example implementation, the automatic feedback loop comprises assigning a score to the initially generated output (image of the car). In this example the score is generated by comparing the output to images of existing cars that are known to have good aerodynamics. Based on the similarity, the output is assigned a score. The automatic feedback loop then involves the system attempting to increase the score for the output by redefining properties of the output and scoring the redefined outputs in the same manner, with the aim of increasing the score with each iteration. In this example, this process will involve the machine learning algorithm accessing a digital database of previously generated outputs of images of cars which were also scored based on how aerodynamic their designs were. From this, it is determined what types of property have historically led to outputs with high scores and how redefining certain properties has impacted the score of a respective output. Based on this, the machine learning algorithm redefines various properties of the generated output, with the aim of increasing the score associated with the output. With each iteration, it is determined whether the most recent redefinitions resulted in an increased or decreased performance score for the output. The system is configured to give a positive bias in future outputs to redefinitions which were successful (increased the score of the output), and vice versa for redefinitions which were unsuccessful (decreased the score of the output).

Through this process, the machine learning algorithm will iterate towards an output with an optimised combination of properties, and thereby generate car designs with increasingly high performance scores. This optimisation is performed within the limits provided by the user in the high level code—in other words, the user specifies that the design is to be of a red sedan car, and the machine learning optimises the remaining properties based on an evaluation criteria. In this case the evaluation criteria is based on similarity to aerodynamic designs. As a result, the automatic feedback loop generates increasingly aerodynamic car designs (but all designs comprise a red sedan, as these properties were specified at the outset by the user).

As mentioned above, in this example implementation a manual feedback loop is also provided. In particular, the user in this example can be monitoring the iterations of the output generated by the automatic feedback loop and may at some point decide that, while they are happy for the machine learning algorithm to specify almost all of the form factors (lower-level properties) of the car, they really want the car to include an air intake spoiler because the user knows that this improves aerodynamics. The user also wants the car to have tinted windows, for aesthetic reasons. Finally, the user has noticed that by attempting to optimise aerodynamics, the outputs being generated by the machine learning algorithm have increasingly smaller wingmirrors. The user knows that wingmirrors that are too small are not safe for use in everyday vehicles, and so wishes to intervene to reverse this trend.

As a result, the user in this example provides manual input to the high-level code specifying a primary style of the car as well as some secondary styles. The user also manually specifies that the car has a spoiler, manually configures the tint of the windows at each side of the car and manually specifies the minimum diagonal length of the wingmirror surface. In this example the user again provides these inputs in the form of statements in the high-level code, such that the code now reads as follows:

vehicle_type: car
colour: red
car_type: sedan
engine_type: electric
style: sport
secondary_styles:
family friendly
futuristic
spoiler: yes
windows:

tint:
  front: 0%
  side: 60%
  back: 10%
wingmirrors:
  minimum diagonal surface length: 15 mm The manner in which user-specified properties shape the output will depend on the type of property.

In this example the machine learning algorithm is configured to associate the labels provided by the user with particular properties, which it accordingly incorporates into subsequently generated outputs. As can be seen, the user has in this example manually specified some broad features, such as that the primary style of the car is "sport" and that the car also comprises a number of secondary styles: "family friendly" and "futuristic". As a result, the machine learning algorithm is restricted to generating outputs having these features. For example, the "family friendly" style in this example leads the machine learning algorithm to generate outputs with large trunks and at least five doors.

The effect of other user-defined properties may be more explicit, for example in this implementation the specified tint percentages for the windows are precise and so the machine learning algorithm is restricted to generating outputs with windows having these precise tint levels. The inclusion of a spoiler is also fairly specific, although the exact shape and type of spoiler is not defined and so is left to the machine learning algorithm to optimise. The minimum wingmirror size is specific, however no upper bound is specified so the machine learning algorithm is effectively free to generate outputs having any wingmirror size and shape, as long as the diagonal length is above the specified minimum.

Following these manual interventions, the system generates further outputs, now restricted by both the initial statements and the new additional statements provided by the user in the high level code. As a result, the process of automatically generating increasingly aerodynamically optimised car designs continues, but within the additional bounds set by the user.

As can be seen, through a combination of user input and machine-learning driven improvement, a succession of outputs can be generated, with each successive output representing a slight (or in some cases major) modification on the previous output depending on which properties have been redefined through user input and machine learning. The user is free to manually define as many or as few properties of the output as they wish. In this example, the user knew that the addition of a spoiler would aid aerodynamics, and so they specified this manually. The machine learning algorithm may, through the iterative optimisation of the outputs, have eventually added a spoiler by itself, however this may have taken many iterations. Instead of waiting for this to occur, the user was able to manually provide the required input, improving the efficiency of optimising the outputs. The user was also able to use their knowledge regarding the minimum safe size of the wingmirrors to restrict that aspect of the output. Left to its own devices, the machine learning algorithm may have continued to reduce the wingmirror size to smaller than a safe level. Thus, the user is able to ensure safety standards are upheld. The user is also able to ensure that certain utilitarian features of the output are maintained, such as "family friendly" features like a large trunk and five doors. Finally, the user is also able to implement aesthetic choices such as the tinting of the windows.

It will be appreciated that the above-described example is provided merely for illustrative purposes. The user could have chosen to specify any of the properties of the output. The code described is merely illustrative. In addition, it will be appreciated that the manner in which the machine learning algorithm determines how to define properties of the output will vary based on the implementation, how the machine learning algorithm is trained and configured and what evaluation metric is being used to evaluate the outputs. In other words, while the system in the above example was configured to optimise the design for aerodynamics, the system could have been configured to additionally or alternatively optimise one or more other features of the output. For example, the system could have been configured to preferentially incorporate features which appear in cars having other technical benefits such as low weight, low manufacturing cost, low emissions or which are simply common to a certain type of car or in popular or high selling cars. Any suitable evaluation criteria could have been used to optimise the outputs.

Turning now to the second example implementation, a user may desire to use the disclosed methods to assist in generating machine learning models for predicting the likelihood of a particular outcome. A machine learning model (or machine learning solution) can learn to approximate the relationship between a set of input observations and their observed outcomes.

The machine learning model (or machine learning solution) can be used to make predictions of the outcome of new input observations, the actual outcomes of which are unknown. Typically, a machine learning model (or machine learning solution) comprises a series of algorithms and transformations which can learn to approximate the relationship between a set of input observations and their observed outcomes.

In this example, the user intends to generate and optimise a machine learning model which predicts how long a person will have to wait for a kidney transplant. As will be appreciated, a machine learning model of this sort will find ready application in the medical sector. To achieve this, the user in this example implementation can again make use of a computer system utilising the methods and mechanisms of the present disclosure.

As in the first example implementation, the process begins with the user providing code for generating the output. The code is generated in a high level language and comprises user-defined statements. The initially provided code in this example reads as follows:

features:
  categorical:
    blood type
    haplotypes,
    disallowables
    ethnicity
    date available
  numerical:
    age
  predicting: When a suitable Kidney will become available
  evaluation_criteria: Area Under Curve As can be seen, various features of the output (the machine learning model) are defined by the user at the outset, such as categorical data which the generated machine learning model should be configured to use to generate predictions. In this example the categorical data includes a patient's blood type, haplotypes (which are a group of six antigens), disallowables (which are specific genetic markers indicating incompatibility) and ethnicity. The kind of numerical data which the generated machine learning model should be configured to use is also specified, namely the patient's age. The code provided also specifies what the generated machine learning model should be configured to predict, which in this case is when a suitable kidney will become available. Finally, the code specifies the evaluation criteria which the generated machine learning model should be configured to use to perform its predictions, which in this example is an Area Under Curve method.

As in the first example implementation, the code is provided to a computer system and the computer system generates an output (a machine learning model in this example) based on the code and using a machine learning algorithm. As in the first example implementation, the machine learning algorithm defines a variety of properties of the output (the machine learning model) which were not defined by the user in the initially provided code. In this example, the properties of the output defined by the machine learning model include definitions for possible types of machine learning model to use and are generated based on training data previously provided to the machine learning algorithm. As in the first example implementation, the user could have specified as many or as few properties of the output as they liked.

In this example, the properties of the output defined by the machine learning algorithm are not added to the code in statements. In other words, in this example the output is generated based on the initial high-level code provided by the user, and any undefined properties are defined directly by the system rather than being added to the code first. Thus, this example implementation makes use of the process labelled "B" in FIG. 2 only. In some implementations this may not be the case, in other words the system may define properties of the output at the code level, as was done in the first example implementation for the property "engine type" (i.e. processes "A" and or "B" of FIG. 2 can be used).

The output (machine learning model) is generated by the system and can then be used to run predictions on unseen test data which is provided to the system. Based on how well the machine learning model performs on the unseen test data, the machine learning model is assigned a score which indicates its associated level of performance, in other words the quality of its predictions. In this example, the test data comprises historical transplant matching data. In this example the unseen test data is a portion of the training data that was used to train the machine learning model but was held back, in other words it is a part of the training data that was not used to train the machine learning model. It will be appreciated that the type of training data used to evaluate the machine learning model will depend on the type of machine learning model generated.

As in the first example implementation, an automatic feedback loop then begins, whereby the system redefines one or more properties of the machine learning model that were defined by the machine learning algorithm of the system. As in the first example, the redefinitions are based on the scores assigned to existing machine learning models, which are stored in a digital database accessible to the system. The database also stores indications of how redefining various properties of existing outputs has impacted the scores associated with those outputs. Based on this data, the system is, as in the first example implementation, configured to optimise the machine learning model so as to increase its associated score. In particular, with each iteration of the output (machine learning model) it is determined whether the most recent redefinition(s) resulted in an increased or decreased performance score for the output. The system is configured to give a positive bias in future outputs to redefinitions which were successful (increased the score of the output), and vice versa for redefinitions which were unsuccessful (decreased the score of the output).

Through this process, the machine learning algorithm will iterate towards an output with an optimised combination of properties. As a result, because in this example a high score is indicative of effective predictive power of a model and because the outputs are scored based on historical kidney transplant data, the system generates a sequence of machine learning models which are iteratively better at predicting how long a patient will wait for a kidney transplant.

As in the first example implementation, this iterative optimisation of the output occurs within the bounds specified by the user in the high level code. Also as in the first example implementation, a user can provide manual feedback to the system at any point during the iterative optimisation of the outputs by manually specifying properties of the machine learning model in the high-level code. For example, the user may at some point notice, or may already be aware of the fact, that the problem at hand (predicting when a kidney transplant will become available) is particularly well suited to using deep neural networks. Accordingly, the user can step in and manually limit the machine learning algorithm to only generate machine learning models which comprise deep neural networks. The user can also define more specific properties, for example based on experience of the kinds of property that typically work well for predicting outcomes such as this. For example, in this example the user specifies the learning rate of the model, the number of layers of the neural network, the number of hidden neurons in the first layer and the activation function based on their knowledge and expertise of neural networks. As a result, the modified code reads as follows:

```
features:
  categorical:
    blood type
    haplotypes (which are a group of 6 antigens),
    disallowables (specific incompatibility genetic markers)
    ethnicity
    date available
  numerical:
    age
predicting: When a suitable Kidney will become available
evaluation_criteria: Area Under Curve
model:
  deep neural network:
    learning rate: 0.023
    num layers: 10
    layer 1:
      num hidden neurons: <12
      activation function: Rectified linear unit
```

As a result of these manual modifications to the code, subsequent machine learning models generated by the system will comprise deep neural networks having the properties specified by the user. Within these bounds, the automatic optimisation of the model may continue in the usual manner, as in the first example implementation.

As in the first example implementation, the user could have specified as many or as few properties of the output (machine learning model) as they wished, at any point of the process. Accordingly, the user is able to use their experience to limit certain properties about which they are confident, while leaving others to the machine learning algorithm to optimise, based on historical transplant matching training data. As in the first example, this combination of human experience and machine learning leads to efficiency gains, as outputs are optimised more quickly and user requirements are incorporated.

As in the first example implementation, it will be appreciated that the above-described second example implementation is provided merely for illustrative purposes. The user could have chosen to specify any of the properties of the output. The code described is merely illustrative. In addition, it will be appreciated that the manner in which the machine learning algorithm determines how to define properties of the output will again vary based on the implementation, how the machine learning model is trained and configured and what evaluation metric is being used. Any suitable evaluation criteria may be used to optimise the outputs.

The above detailed description describes a variety of example arrangements and implementations of methods of generating outputs using machine learning. However, the described arrangements and methods are merely examples, and it will be appreciated by a person skilled in the art that various modifications can be made without departing from the scope of the appended claims. Some of these modifications will now be briefly described, however this list of modifications is not to be considered as exhaustive, and other modifications will be apparent to a person skilled in the art. The features and functionality described above, both in reference to the first and second example implementations and in the preceding description can be combined in any suitable combination and can also be combined with any of the variations and modifications described below.

Figure 3:
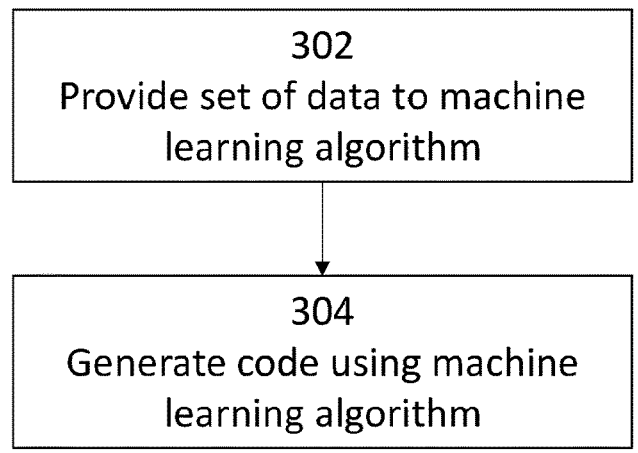
FIG. 3 shows a method of automatically generating initial code for generating one or more outputs according to the present disclosure.

Turning to FIG. 3, a first optional modification will be described. A method of providing code for use in generating an output is shown. This method can be combined with the functionality described in FIGS. 1 and 2.

In some arrangements, the code for generating an output in the manner described above with reference to FIGS. 1 and 2 may all be provided by a user. For example, the user may type out the code in the high-level language of the code. Alternatively, however, the code may be initially provided automatically, by a machine learning algorithm (optionally the same machine learning algorithm which is then involved in generating the output from the code). This automatic method of providing the initial code for generating the output is shown in FIG. 3.

At block 302, a set of data is provided to a machine learning algorithm. This data may comprise training data, for example containing a set of previous examples of code used to generate outputs in a particular domain.

Based on this data, the machine learning algorithm may generate the code. This is shown at block 304. The generated code may then be used to generate an output, as described in reference to FIG. 1. Thus, blocks 302 and 304 of FIG. 3 can effectively replace block 102 of FIG. 1, in some implementations. The code can go through the same feedback loops as described in reference to FIG. 2. In other words, the code generated at block 304 of FIG. 3 can be the code 202 of FIG. 2.

Figure 4:
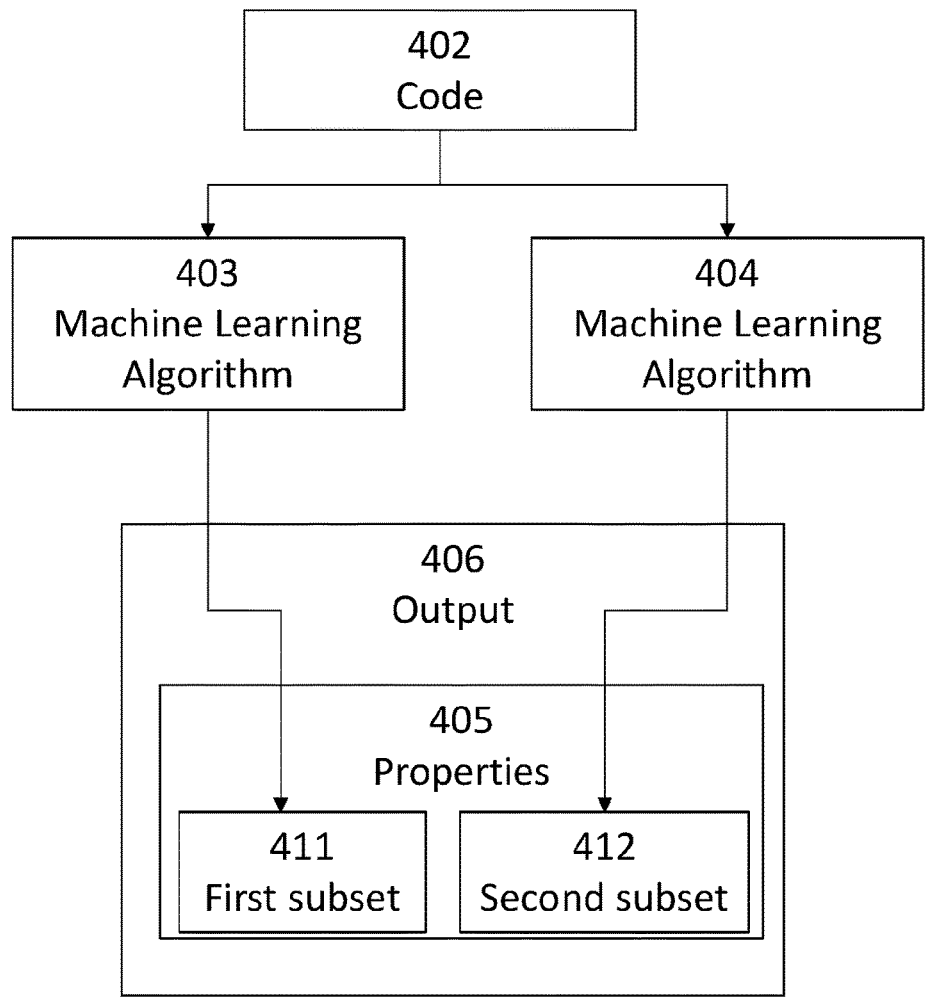
FIG. 4 shows a method of generating a first and second subset of properties of an output according to methods of the present disclosure.

Turning now to FIG. 4, further additional functionality that may be incorporated into the methods described in reference to FIGS. 1 and 2 is described. In particular, FIG. 4 schematically shows a process whereby certain properties of an output are defined by a first machine learning algorithm and other properties of the output are defined by a second machine learning algorithm.

Code 402, which is equivalent to code 202 of FIG. 2, is provided. One or more properties not defined in the code are defined by first and second machine learning algorithms 403, 404, which are in combination equivalent to the machine learning algorithm 204 of FIG. 2. An output 406, which is equivalent to output 206 of FIG. 2, is generated, based on the properties defined in the code 402 and defined by the machine learning algorithms 403,404. In other words, the overall process of FIG. 4 is the same as that of FIGS. 1 and 2.

In this variation, however, the properties 405 of the output 406 that are not defined in the code 402 comprise a first subset 411 and a second subset 412. The first subset 411 of properties is of a first type, wherein the first type of property is specified in the high-level language of the code, in other words is or can be defined in a statement provided in the high-level code. The second subset 412 of properties is of a second type, wherein the second type of property is not specified in the high-level language of the code, in other words cannot be easily defined, or cannot be defined at all, in a statement provided in the high-level code. In particular, the second type of property comprises properties or descriptions of the output 406 that are not represented explicitly in the high-level code 402, but are nevertheless generated and held implicitly by the system. Some properties may be 'expected' and even persisted to disk and some may have been 'discovered' by the machine learning algorithm and may be transient.

In this example implementation, the first machine learning algorithm 403 is used to define the first undefined subset 411 of properties. The other (second) machine learning algorithm 404 is used to define the second undefined subset 412 of properties. In this implementation a score-based feedback mechanism is used to enable the first and/or second machine learning algorithm 404 to generate the first and second subset 411, 412 of properties of the output 406 respectively. The same or different feedback mechanisms may be used for both machine learning algorithms.

In this example, the first subset of properties 411 comprises elements of the output 406 that are commonly used to define or constrain the search space in which the first and second machine learning algorithms operate. These properties 411 could be provided as statements in the high level code 402 used to define the output 406. The second subset of properties 412 comprise elements of the output 406 that the second machine learning algorithm 404 will discover as it solves the problem provided to it and are typically not properties that could or would be exposed in the high-level code 402 used to define the output 406. The first and second machine learning algorithms typically run at different times in the processing and solve different parts of the problem (in other words generate different parts of the output 406). An example property belonging to the first subset of properties 411 is the choice of machine learning model (deep neural network) described above in relation to the second example implementation. An example property belonging to the second subset of properties 412 is the weighting between nodes in the layers of the neural net described above in relation to the second example implementation.

Using different algorithms and machine algorithms to generate different respective subsets of properties of the output in this manner can be advantageous because certain algorithms may be better suited to generating certain types of property and solving different types of problems.

Yet further additional functionality can be provided in some implementations by configuring the machine learning algorithm to intelligently define properties of outputs based on those already defined in the code for generating the output. In particular, in some implementations, the machine learning algorithm may assess which properties are already defined in the high-level code. Based on the properties defined in the code already, an intended purpose of the desired output may be determined by the machine learning algorithm. The machine learning algorithm may then define the at least one undefined property of the output based on the determined intended purpose of the desired output. For example, based on determining that certain properties associated with an image of a particular object have been defined in the code, the machine learning algorithm may determine that the desired output is an image of that object. As a result of this determination, the machine learning algorithm may favour properties that have historically resulted in successful images of that type of object, and may accordingly preferentially define any undefined properties to include said historically successful properties.

As can be seen, the disclosed methods provide a variety of benefits. In particular, initial code provided for generating a desired output does not need to be fully specified. Accordingly, in cases where this code is provided by a user, the user does not need to specify each property of the output. This may be beneficial, because the user may not be confident about how one or more properties of the output should be defined. Alternatively, one or more properties may be of low importance and the user may not want to waste time defining low priority outputs. In either case, the properties in question can be left undefined, and can be defined and then optimised by the machine learning algorithm. The speed and efficiency of generating and optimising outputs can therefore be increased.

Providing a user with the ability to decide which properties to define manually and which to leave to the machine learning algorithm provides further benefits in the sense that machine learning algorithms may be particularly well suited to generating particular types of properties of outputs, but less well suited to generating other types of properties of outputs. In this case, the user can define the properties about which they know the machine learning algorithm is ill suited to define. On the other hand, the user may refrain from defining the properties which they know the machine learning algorithm is well suited to define. Through this mechanism, human experience and machine learning can be combined to again increase the efficiency of generating optimised outputs.

As described above, the disclosed method is also iterative in the sense that the defined outputs can be continuously optimised through feedback loops and redefinition of various properties of the outputs. As in the case of the original definition of the properties of an output, redefinition of the output properties can also comprise a combination of user input and automatic redefinition. Thus, human experience can be combined with the capabilities of machine learning to optimise outputs more effectively and efficiently.

Figure 5:
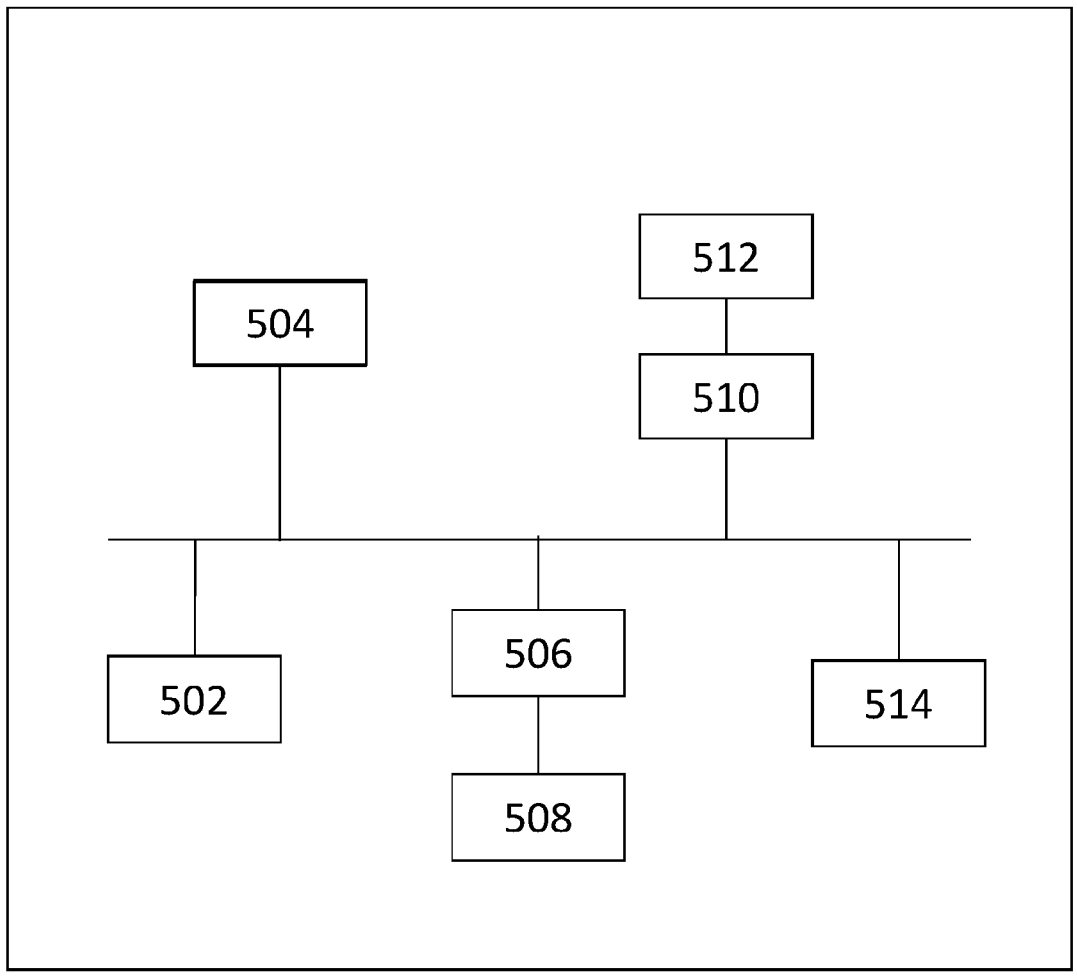
FIG. 5 shows a schematic representation of a computer apparatus for putting the disclosed methods into effect.

Turning finally to FIG. 5, FIG. 5 shows a schematic and simplified representation of a computer apparatus 500 which can be used to perform the methods described herein, either alone, in combination with other computer apparatuses or as part of a "cloud" computing arrangement.

The computer apparatus 500 comprises various data processing resources such as a processor 502 coupled to a central bus structure. Also connected to the bus structure are further data processing resources such as memory 504. A display adapter 506 connects a display device 508 to the bus structure. One or more user-input device adapters 510 connect a user-input device 512, such as a keyboard and/or a mouse to the bus structure. One or more communications adapters 514 are also connected to the bus structure to provide connections to other computer systems 500 and other networks.

In operation, the processor 502 of computer system 500 executes a computer program comprising computer-executable instructions that may be stored in memory 504. When executed, the computer-executable instructions may cause the computer system 500 to perform one or more of the methods described herein. The results of the processing performed may be displayed to a user via the display adapter 506 and display device 508. User inputs for controlling the operation of the computer system 500 may be received via the user-input device adapters 510 from the user-input devices 512.

It will be apparent that some features of computer system 500 shown in FIG. 5 may be absent in certain cases. For example, one or more of the plurality of computer apparatuses 500 may have no need for display adapter 506 or display device 508. This may be the case, for example, for particular server-side computer apparatuses 500 which are used only for their processing capabilities and do not need to display information to users. Similarly, user input device adapter 510 and user input device 512 may not be required. In its simplest form, computer apparatus 500 comprises processor 502 and memory 504.

While various specific combinations of components and method steps have been described, these are merely examples. Components and method steps may be combined in any suitable arrangement or combination. Components and method steps may also be omitted to leave any suitable combination of components or method steps.

The described methods may be implemented using computer executable instructions. A computer program product or computer readable medium may comprise or store the computer executable instructions. The computer program product or computer readable medium may comprise a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). A computer program may comprise the computer executable instructions. The computer readable medium may be a tangible or non-transitory computer readable medium. The term "computer readable" encompasses "machine readable".

The singular terms "a" and "an" should not be taken to mean "one and only one". Rather, they should be taken to mean "at least one" or "one or more" unless stated otherwise. The word "comprising" and its derivatives including "comprises" and "comprise" include each of the stated features, but does not exclude the inclusion of one or more further features.

The above implementations have been described by way of example only, and the described implementations are to be considered in all respects only as illustrative and not restrictive. It will be appreciated that variations of the described implementations may be made without departing from the scope of the disclosure. It will also be apparent that there are many variations that have not been described, but that fall within the scope of the appended claims.

The invention claimed is:

1. A computer-implemented method for generating one or more outputs, comprising:
   providing code in a high-level language to a processor, the code comprising one or more statements defining one or more properties of a desired predictive output;
   determining by the processor that one or more properties of the desired predictive output are undefined in the code;

defining by the processor at least one of the one or more undefined properties using a machine learning algorithm;

incorporating by the processor the at least one property defined using the machine learning algorithm into the code in at least one statement to provide a first modified version of the code;

generating by the processor a resulting output based at least partly on the first modified version of the code; and redefining by the processor at least one property of the resulting output defined using the machine learning algorithm to generate a redefined resulting output, wherein at least one property defined using the machine learning algorithm is redefined automatically by the processor based on an associated level of performance of one or more previous resulting outputs; and generating by the processor the redefined resulting output.

2. The computer-implemented method of claim 1, wherein redefining at least one property of the resulting output comprises amending or adding at least one respective corresponding statement in the code to provide a second modified version of the code, and wherein the redefined resulting output is generated based at least partly on the second modified version of the code.

3. The computer-implemented method of claim 1, wherein at least one property defined using the machine learning algorithm is redefined via user input.

4. The computer-implemented method of claim 1, wherein the machine learning algorithm is a solution space search algorithm.

5. The computer-implemented method of claim 4, wherein the solution space search algorithm comprises one of:
   a Bayesian algorithm;
   an evolutionary algorithm, for example a genetic programming algorithm;
   a quantum annealing algorithm;
   a reinforcement learning algorithm;
   hyperbanding;
   a gradient-based algorithm;
   a population-based training algorithm;
   a supervised machine learning algorithm; or
   an unsupervised machine learning algorithm.

6. The computer-implemented method of claim 1, further comprising:
   prior to providing the code in a high-level language:
   providing a set of data to the machine learning algorithm; and
   generating, using the machine learning algorithm, the code in the high-level language based on the set of data.

7. The computer-implemented method of claim 1, wherein the one or more undefined properties of the desired predictive output comprise:
   a first undefined subset of properties of a first type, wherein the first type of property is specified in the high-level language of the code; and
   a second undefined subset of properties of a second type, wherein the second type of property is not specified in the high-level language of the code.

8. The computer-implemented method of claim 7, wherein:
   a first machine learning algorithm and a first score-based feedback mechanism are used to define the first undefined subset of properties; and
   a second machine learning algorithm and a second score-based feedback mechanism are used to define the second undefined subset of properties.

9. The computer-implemented method of claim 1, wherein the desired predictive output includes at least one machine learning model, and wherein the method further comprises:
   providing training data to the machine learning algorithm for training the machine learning algorithm to define undefined properties; and
   wherein the level of performance associated with each machine learning model is based on test data.

10. The computer-implemented method of claim 1, further comprising:
    determining, based on the properties defined in the code used to define the desired predictive output, an intended purpose of the desired predictive output,
    wherein defining at least one of the undefined one or more properties using a machine learning algorithm is based at least in part on this determination.

11. A computer-implemented method for generating one or more outputs, comprising:
    providing code in a high-level language to a processor, the code comprising one or more statements defining one or more properties of a desired tangible output;
    determining by the processor that one or more properties of the desired tangible output are undefined in the code;
    defining by the processor at least one of the one or more undefined properties using a machine learning algorithm;
    generating by the processor a resulting output based on the one or more properties defined in the code and the at least one property defined using the machine learning algorithm; and
    redefining by the processor at least one property of the resulting output defined using the machine learning algorithm to generate a redefined resulting output,
    wherein at least one property defined using the machine learning algorithm is redefined automatically by the processor, and
    wherein at least one property defined using the machine learning algorithm is redefined automatically by the processor based on an associated level of performance of one or more previous resulting outputs; and
    generating by the processor the redefined resulting output.

12. The method of claim 11, wherein the desired tangible output includes at least one of an image or a web page.

* * * * *